(12) United States Patent
Kuraya

(10) Patent No.: US 9,249,850 B2
(45) Date of Patent: Feb. 2, 2016

(54) MACHINE TOOL EQUIPPED WITH FLOATING MECHANISM

(76) Inventor: Hisanobu Kuraya, Aichi (JP)

( * ) Notice: Subject to any disclaimer, the term of this patent is extended or adjusted under 35 U.S.C. 154(b) by 606 days.

(21) Appl. No.: 13/731,010

(22) PCT Filed: Jun. 29, 2011

(86) PCT No.: PCT/JP2011/064918
§ 371 (c)(1),
(2), (4) Date: Mar. 31, 2013

(87) PCT Pub. No.: WO2012/002438
PCT Pub. Date: Jan. 5, 2012

(65) Prior Publication Data
US 2013/0206439 A1    Aug. 15, 2013

(30) Foreign Application Priority Data

Jul. 2, 2010   (JP) .................................. 2010-152091

(51) Int. Cl.
*B23B 31/36* (2006.01)
*F16F 7/00* (2006.01)
(Continued)

(52) U.S. Cl.
CPC . *F16F 7/00* (2013.01); *B23B 31/36* (2013.01); *B23Q 1/70* (2013.01); *B23Q 11/0028* (2013.01); *B23Q 11/0032* (2013.01); *B25J 11/005* (2013.01); *B25J 15/0019* (2013.01);
(Continued)

(58) Field of Classification Search
CPC ...... B23Q 1/70; B23Q 1/706; B23Q 11/0028; B23Q 11/0032; B23B 31/36; B25J 17/02; B25J 17/0233; B25J 17/0208; B25J 11/005; B25J 15/0019; F16F 7/00

USPC .......... 173/39, 152, 213, 218, 217, 162.1, 42, 173/44, 165, 171; 279/6, 16, 20; 408/82, 408/88, 89, 127, 150, 151, 236; 409/132, 409/143, 146, 200, 201, 232, 239

See application file for complete search history.

(56) References Cited

U.S. PATENT DOCUMENTS 3,454,114 A  *  7/1969  Poage ....................... E21B 7/02
                                                    173/152
3,800,887 A  *  4/1974  West ......................... E21B 3/02
                                                    173/152

(Continued)

FOREIGN PATENT DOCUMENTS

| JP | 59-019694 A | 2/1984 |
| JP | 62-140764 A | 6/1987 |
| JP | 3-0281189 A | 12/1991 |

*Primary Examiner* — Scott A. Smith
(74) *Attorney, Agent, or Firm* — GFD Patents LLC; Gerald F. Dudding

(57) ABSTRACT

Provided is a machine tool which is equipped with a floating mechanism, and the whole of which can be miniaturized and lightened, the floating mechanism being equipped with carriers of loads generated in both radial and thrust directions, resulting in deformation of the floating mechanism being reduced. The floating section (4) of the machine tool is provided with a hollow circular-plate-shaped inner ring (9) comprising an outer peripheral surface section (9a), an upper surface section (9b), and a bottom surface section (9c); and an outer ring (8) comprising an inner peripheral section (8a) and an inner ring receiving section (8b). The outer ring (8) is fixed to a robot arm. The inner ring (9) is fixed to a tool driving section. The outer peripheral surface of the inner ring (9) is formed by a spherical surface which is equidistant from the center point (14) of a hollow circular plate.

13 Claims, 4 Drawing Sheets

(51) Int. Cl.
  *B23Q 1/70* (2006.01)
  *B23Q 11/00* (2006.01)
  *B25J 15/00* (2006.01)
  *B25J 11/00* (2006.01)
  *B25J 17/02* (2006.01)

(52) U.S. Cl.
  CPC ............ *B25J17/0233* (2013.01); *B23Q 1/706* (2013.01); *B23Q 2220/006* (2013.01); *B25J 17/02* (2013.01)

(56) References Cited

U.S. PATENT DOCUMENTS

| | | | | |
|---|---|---|---|---|
| 4,311,224 A * | 1/1982 | Kato | ............... | F16D 1/094 192/56.5 |
| 4,759,686 A * | 7/1988 | Kirst | ............... | B25J 15/0491 24/603 |
| 5,012,878 A * | 5/1991 | Anderson | ............... | E21B 17/07 173/213 |
| 5,017,062 A * | 5/1991 | Leroux | ............... | B23C 3/055 408/83.5 |
| 5,370,194 A * | 12/1994 | Anderson | ............... | E21B 3/02 173/152 |
| 5,752,706 A * | 5/1998 | Hodges | ............... | B23B 31/026 279/16 |
| 5,769,576 A * | 6/1998 | Gerard | ............... | B23C 3/055 408/236 |
| 5,829,928 A * | 11/1998 | Harmand | ............... | B23C 3/055 408/109 |
| 5,882,158 A * | 3/1999 | Lechleiter | ............... | B23Q 5/34 408/236 |
| 6,047,612 A * | 4/2000 | McMurtry | ............... | B23Q 1/265 310/67 R |
| 6,368,012 B1 * | 4/2002 | St. Onge | ............... | B23P 19/102 403/368 |
| 6,690,208 B2 * | 2/2004 | Gloden | ............... | B25J 19/063 192/150 |
| 6,739,410 B2 * | 5/2004 | Smith | ............... | E21B 7/24 173/213 |
| 7,320,374 B2 * | 1/2008 | Folk | ............... | E21B 19/02 166/77.51 |
| 7,555,844 B2 * | 7/2009 | Wisniewski | ............... | B23B 31/30 33/1 M |
| 8,152,421 B2 * | 4/2012 | Yagishita | ............... | B23C 3/02 409/132 |

\* cited by examiner (a)

(b)

(a)

(b)

MACHINE TOOL EQUIPPED WITH FLOATING MECHANISM

TECHNICAL FIELD

The present invention relates to a machine tool that performs various kinds of machining such as deburring, grinding, and cutting and, particularly to, a machine tool equipped with a floating mechanism.

BACKGROUND ART

Conventionally, a machine tool equipped with floating mechanism has been known. In the machine tool, a piston is pressed with an air pressure or spring force to press at a constant pressure various tools such as a grindstone and a drill fit to the tip of the machine tool to machine a workpiece and, at the same time, an error in shape of the workpiece and displacement occurring between the workpiece and a reference workpiece owing to the different working shapes of the different workpieces and misalignment of the workpiece is absorbed by moving the various tools such as the grindstone and the drill (Patent Document 1).

PRIOR ART TECHNICAL LITERATURE

Patent Documents

Patent Document 1: Japanese Patent Application Laid-Open (JP-A) No. Hei3-281189

DISCLOSURE OF INVENTION

Problem to be Solved by the Invention

The machine tool disclosed in Patent Document 1 includes a spring mechanism and a spherical surface bearing in a configuration that a load in a tilt direction of the shaft of the various tolls such as the grindstone and the drill (hereinafter referred to as a radial direction) is carried by using the center of the spherical surface bearing as a supporting point.

However, on the spherical surface bearing of this machine tool, the load in a direction perpendicular to the radial direction (hereinafter referred to as a thrust direction) applies force in a direction to spread the outer ring side of the spherical surface bearing like a wedge, so that the spherical surface bearing may be deformed to cause malfunctioning in many cases. Further, to secure rigidity, this machine tool must be large to be heavy, and therefore, the machine tool would need to have a device having a carrying weight larger than the force required by cutting performance.

To solve the problems, the present invention has been developed, and it is an object of the present invention to provide a machine tool equipped with floating mechanism that has a carrier of loads occurring in both a radial direction and a thrust direction to miniaturize and lighten the machine as a whole while suppressing deformation of the floating mechanism and securing rigidity.

SUMMARY OF THE INVENTION

A first aspect of the present invention provides a machine tool for machining a workpiece by using various tools fit to a machine having a robot arm or an NC device. The machine tool includes a hollow cylinder section including a tubular piston, a tool driving section at least one portion of which is fixed in an internal space of the hollow cylinder section to drive those tools, and a floating section which exists between the tool driving section and the hollow cylinder section. One portion of this floating section comes in contact with the tubular piston of the hollow cylinder section and is pressed by this tubular piston at a predetermined pressure. Therefore, by employing the hollow cylinder including the tubular piston, the tool driving section can be disposed in the hollow cylinder. As a result, the center of a movable portion of the floating section is positioned near the gravity center of the tool driving section, thereby enabling cutting work at a constant pressure even against a change in cutting direction in which a rapid acceleration occurs during movement of the machine tool because it is free of an influence from a change in load owing to inertia during this movement. Further, the air pressure receiving surface of the piston can be thin and cylinder-shaped, so that it is possible to miniaturize and lighten the machine tool while securing rigidity. Further, as compared to the conventional machine tool having a lot of small pistons disposed on its circumference, it is possible to simplify the structure because the number of components can be reduced and the pressing pressure does not change in any radial direction within 360 degrees.

A second aspect of the present invention provides a machine tool for machining a workpiece by using various tools fit to a machine having a robot arm or a numerical control (NC) device. The machine tool includes a hollow cylinder section including a tubular piston, a tool driving section at least one portion of which is fixed in an internal space of the hollow cylinder section to drive the various tools, and a floating section which exists between the tool driving section and the hollow cylinder section, wherein one portion of the floating section comes in contact with the tubular piston and is pressed by the tubular piston at a predetermined pressure. The floating section includes a hollow circular-plate-shaped inner ring having an outer circumferential surface portion, a top surface portion; and a bottom surface portion and an outer ring having an inner circumferential surface portion and an inner ring receiving portion. The outer ring is fixed to a side of the robot arm, the inner ring is fixed to a side of the tool driving section, and an outer circumferential surface of the inner ring is formed of a spherical surface equidistant from a center point of the hollow circular-plate. Therefore, if the load of a workpiece is applied radially on the tip tool, the inner ring fixed to the side of the tool driving section tilts. In this case, since the outer circumferential surface portion of the inner ring is formed spherical surface, the shape and the contact area of the contact portion of the inner ring that comes in contact with the inner circumferential portion of the outer ring are always constant. Further, the contact area can be made large, so that it is possible to carry the load stably while suppressing deformation and wear of the inner ring and the outer ring. Further, by employing the hollow cylinder including the tubular piston, an air pressure receiving surface of the piston can be thin and cylinder-shaped, and therefore, the machine tool can be miniaturized and lightened while securing rigidity. Further, as compared to the conventional machine tool having a lot of small pistons disposed on its circumference, it is possible to simplify the structure because the number of components can be reduced.

A third aspect of the present invention provides a machine tool, wherein a bottom surface portion of the hollow circular-plate-shaped inner ring has a taper-shaped portion that comes in contact with an inner ring receiving portion of the outer ring. Therefore, as compared to a case where the bottom surface portion of the inner ring is plane shaped, the area of the portion of the inner ring that comes in contact with the inner ring receiving portion (pressure receiving area) of the outer ring can be made large when the inner ring is tilted, thereby carrying (receiving) the load stably while suppressing the deformation and wear of the inner ring and the outer ring.

A fourth aspect of the present invention provides a machine tool, wherein a tip portion of the tubular piston that comes in contact with the top surface portion of the hollow circular-plate-shaped inner ring has a taper-shaped portion formed on it. Therefore, the area (pressure receiving area) that comes in contact with the tip portion of the tubular piston can be made large when the inner ring is tilted, thereby carrying the load stably while suppressing the deformation and wear of the piston and the inner ring.

A fifth aspect of the present invention provides a machine tool, wherein a tilt angle of the taper-shaped portion of the portion formed on the bottom surface portion of the hollow circular-plate-shaped inner ring that comes in contact with the inner ring receiving portion of the outer ring is substantially equal to the tilt angle of the taper-shaped portion formed on the tip portion of the tubular piston. As one example, if the maximum tilt angle is five degrees of the shaft of the tool with respect to a reference state where the tool shaft is perpendicular to the working surface of a workpiece, it is possible to set the tilt angle of the taper-shaped portion of the portion formed on the bottom surface portion of the hollow circular-plate-shaped inner ring that comes in contact with the inner ring receiving portion of the outer ring and the tilt angle of the taper-shaped portion formed on the tip portion of the tubular piston to the same tilt angle of five degrees. In this configuration, it is possible to improve the strength of the contact portion of each of the taper-shaped portions and disperse the stresses on these contact portions. Further, it is possible to give the same stress distribution to those contact portions, thereby preventing extra deformations.

A sixth aspect of the present invention provides a machine tool, wherein the tip portion of the tubular piston that comes in contact with the bottom surface portion of the hollow circular-plate-shaped inner ring includes an O-ring. Therefore, owing to the O-ring, when the inner ring is tilt, the portion that comes in contact with the tip portion of the tubular piston can have a large area (pressure receiving area) and be prevented from coming in contact with metal while securing the rigidity of the piston, thereby carrying the load stably while suppressing the deformation and wear of the piston and the inner ring.

A seventh aspect of the present invention provides a machine tool, wherein the inner circumferential surface portion of the outer ring has a baffle segment formed on it at a position where it comes in contact with the outer circumferential surface portion of the inner ring. The baffle segment is fixed as embedded in the outer ring portion so that it may not shift due to a change in load on the inner ring and can receive rotational torque and has a configuration to disperse and receive a radial load and a torque load independently from each other. Accordingly, it is possible to carry (receive) the loads stably while suppressing the deformation and wear of the piston, the outer ring, and the inner ring.

An eighth aspect of the present invention provides a machine tool, including a twister ring at a position where it comes in contact with the outer circumferential surface of the tubular piston, and the twister ring comes in contact with a wall surface of the hollow cylinder section. In the case where the O-ring is used in reciprocating movement, twisting may occur in a groove housing the O-ring. However, the twister ring (X-ring) has an X-shaped cross section, and therefore, twisting cannot be occurred. Further, the twister ring needs a smaller radius-directional allowance (tightening margin) than the O-ring, hence has smaller contact pressure, and smaller friction and wear, and therefore, is excellent in endurance, thereby improving sealing performance. Moreover, it can improve reactions at a low pressure in the floating mechanism, thereby securing stable movements of the machine tool over low to high pressures.

A ninth aspect of the present invention provides a machine tool, wherein the machine tool can be miniaturized and lightened while securing rigidity, thereby eliminating the influence from the inertia force due to movements. Further, as compared to the conventional machine tool having a lot of small pistons disposed on its circumference, it is possible to simplify the structure because the number of components can be reduced and constant-pressure control can be conducted irrespective of tilting directions.

A tenth aspect of the present invention provides a machine tool, wherein loads can be received stably while suppressing the deformation and wear of the inner ring and the outer ring. Further, it is possible to miniaturize and lighten the machine tool and simplify its structure while securing rigidity.

An eleventh aspect of the present invention provides a machine tool, wherein loads can be received stably while suppressing the deformation and wear of the inner ring and the outer ring.

A twelfth aspect of the present invention provides a machine tool, wherein loads can be received stably while suppressing the deformation and wear of the piston and the inner ring.

A thirteenth aspect of the present invention provides a machine tool, wherein it is possible to improve the strength of the contact portion of each of the taper-shaped portions and disperse the stresses on these contact portions. Further, it is possible to give the same stress distribution to those contact portions, thereby preventing extra deformations.

A fourteenth aspect of the present invention provides a machine tool, wherein loads can be received stably while suppressing the deformation and wear of the piston and the inner ring.

A fifteenth aspect of the present invention provides a machine tool, wherein loads can be received stably while suppressing the deformation and wear of the piston, the outer ring, and the inner ring.

A sixteenth aspect of the present invention provides a machine tool, wherein it is possible to improve reactions at a low pressure in the floating mechanism, thereby securing stable movements of the machine tool over low to high pressures.

DESCRIPTION OF EMBODIMENTS

Figure 1:
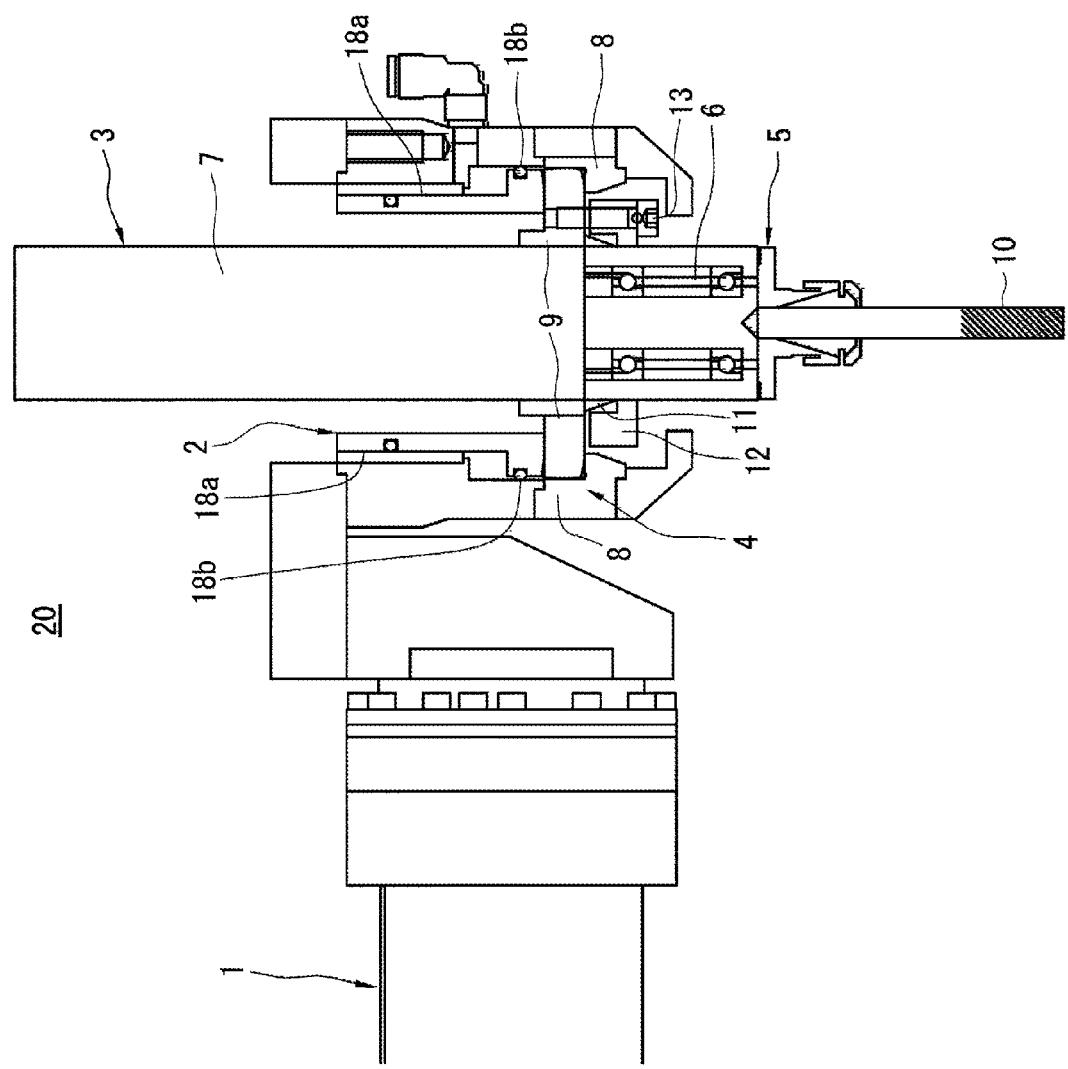
FIG. 1 is an explanatory figure showing an outline of a machine tool according to the present invention.

FIG. 1 is an explanatory figure showing the outline of a machine tool according to the present invention. As shown in the figure, a machine tool 20 of the present invention is attached to a robot arm 1 as one example. The machine tool 20 of the present invention can be attached to a machine having an NC device in place of the robot arm 1.

The machine tool 20 includes a hollow cylinder section 2 having a tubular piston, a tool driving section 3 which drives each of various tools 10 in condition where it is fixed thereto, and a floating section 4 interposed between the tool driving section 3 and the hollow cylinder section 2.

The tool driving section 3 includes each of the various tools 10, a chuck member 5 which grasps those various tools 10, a bearing mechanism 6, and a motor 7 in a configuration that a rotary shaft 7a of the motor 7 and the chuck member 5 are coupled to each other via the bearing mechanism 6. The motor 7 may be driven either by air or electricity. The various tools 10 mean tools that can be used in various machining jobs such as deburring, grinding, and cutting, and are removed from the chuck member 5 and replaced with tools corresponding to various machining jobs.

The hollow cylinder section 2 including the tubular piston and the tool driving section 3 are positioned with respect to each other so that at least one portion of the tool driving section 3 may be fixed via the floating section 4 to an internal space of the hollow cylinder section 2. As described above, the tool driving section 3 has a construction to drive the various tools 10 fixed to the chuck member 5.

Figure 2:
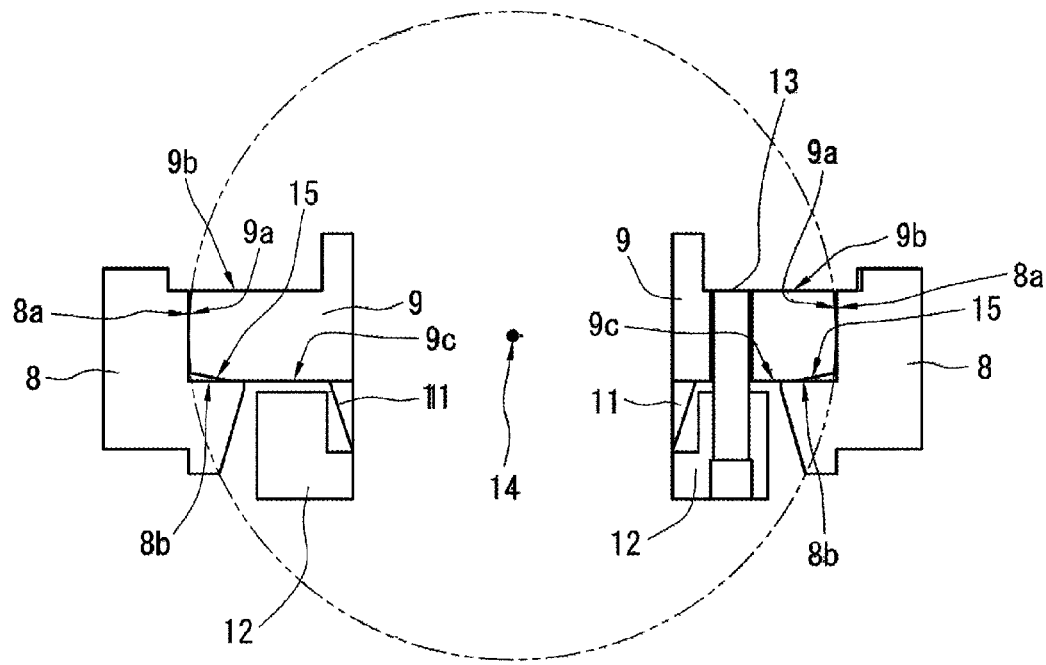
FIG. 2 is an explanatory figure showing a floating section of the machine tool according to the present invention.
Figure 2:
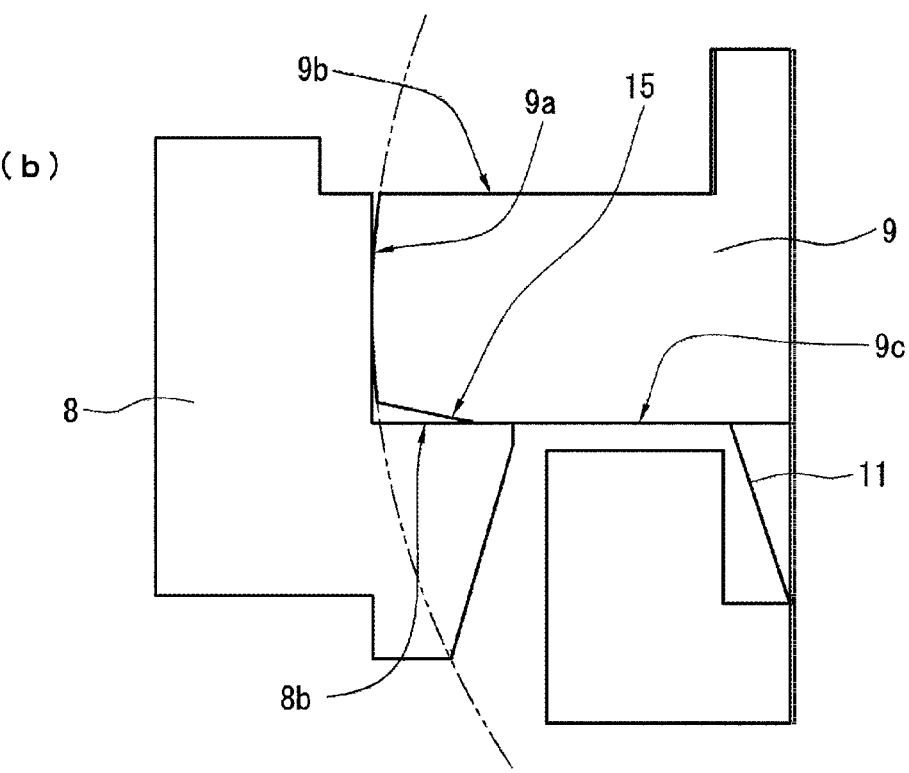

FIG. 2(*a*) is an explanatory figure showing the floating section 4 of the machine tool 20 according to the present invention, and FIG. 2(*b*) is a partially expanded view of FIG. 2(*a*). As shown in the figures, the floating section 4 includes an outer ring 8 and an inner ring 9. In this case, the outer ring 8 is fixed to the side of the robot arm 1 shown in FIG. 1, and the inner ring 9 is fixed to the side of the tool driving section 3 with a wedge member 11, a tightening member 12, and a bolt 13.

The outer ring 8 has an inner circumferential surface portion 8a and an inner ring receiving portion 8b. The inner circumferential surface portion 8a includes a hollow cylinder-shaped curved surface and the inner ring receiving portion 8b includes a flat surface that comes in contact with a bottom surface portion 9c of the inner ring 9.

Next, the inner ring 9 is shaped like a hollow circular-plate having an outer circumferential portion 9a, a top surface portion 9b, and the bottom surface portion 9c. This outer circumferential portion 9a has its spherical surface machined so that it may agree with a spherical surface (denoted by a dash-and-two-dots line) which is equidistant from a center point 14 of the hollow circular-plate shown in FIG. 2. The center point 14 of the hollow circular-plate is defined as a point which exists in a flat plane which is parallel with the flat surface of the top surface portion 9b of the inner ring 9 and the flat surface of the inside of the bottom surface portion 9c, and equidistant from them, and also equidistant from the outer circumferential surface portion 9a.

Next, the top surface portion 9b includes a flat surface which comes in contact with the tubular piston to be described later. Further, the external flat surface of the bottom surface portion 9c has a tapered-shape portion 15 formed on it so that its portion that comes in contact with the inner ring receiving portion 8b of the above outer ring 8 may be tilted.

The floating section 4 has the above-described configuration, so that if a load is applied on the tool at the tip from a workpiece in the radial direction, the inner ring 9 fixed to the side of the tool driving section 3 tilts. In this case, since the outer circumferential surface portion 9a of the inner ring 9 is shaped like a sphere, the shape and the contact area of its contact portion that comes in contact with the inner circumferential surface portion 8a of the outer ring 8 are always constant. Further, since the contact area can be made large, it is possible to stably carry(receive) the loads while suppressing the deformation and wear of the inner ring 9 and the outer ring 8.

Further, the bottom surface portion 9c of the inner ring 9 has the taper-shaped portion 15 formed at that portion where it comes in contact with the inner ring receiving portion 8b of the outer ring 8, so that as compared to a case where the bottom surface portion 9c of the inner ring 9 is flat, the area (pressure receiving area) of the portion that comes in contact with the inner ring receiving portion 8b of the outer ring 8 can be made large when the inner ring 9 is tilted, thereby stably carrying the load while suppressing the deformation and wear of the inner ring 9 and the outer ring 8.

Figure 3:
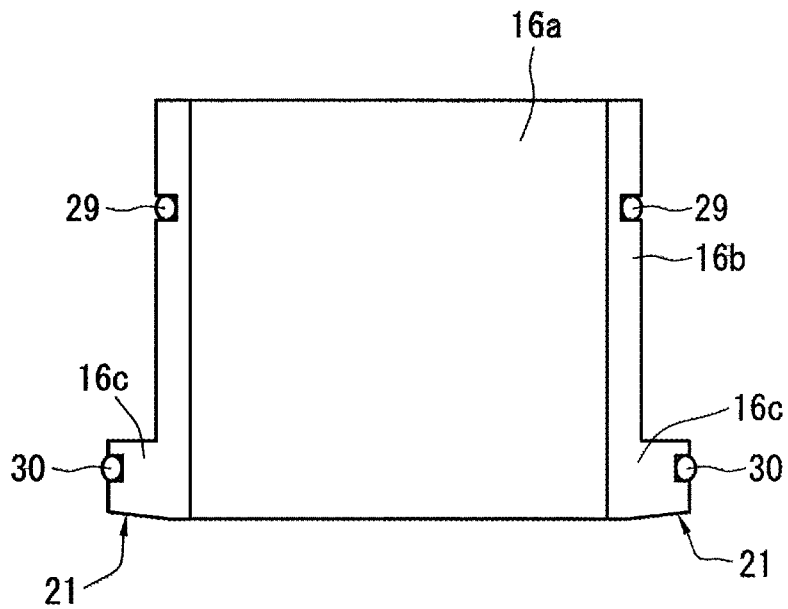
FIG. 3 is a cross-sectional view showing an example of a piston used in the machine tool according to the present invention.
Figure 3:
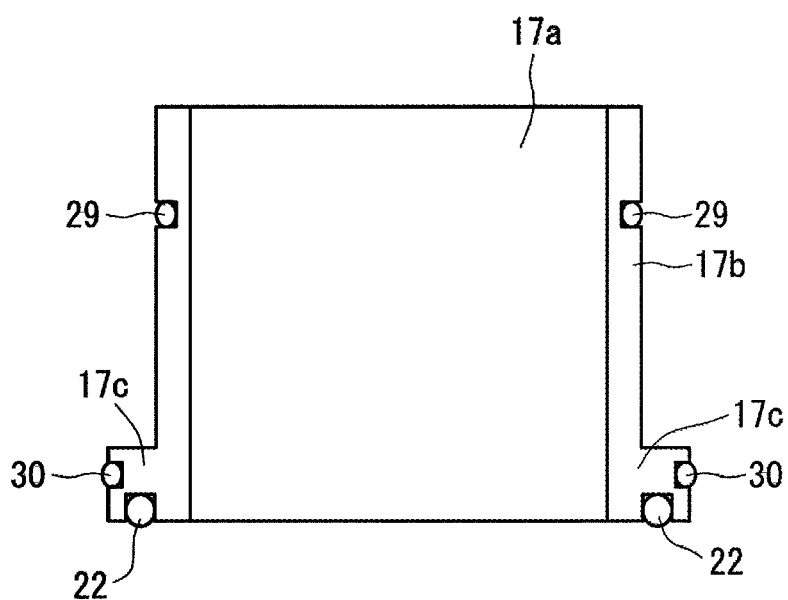

FIG. 3 is a cross-sectional view showing an example of a piston used in the machine tool 20 according to the present invention. A piston 16 in FIG. 3(*a*) includes a hollow portion 16a, an outer circumferential portion 16b, and a tip portion 16c. The tip portion 16c of the tubular piston 16 has a taper-shaped portion 21 formed on it which comes in contact with the top surface portion 9b of the inner ring 9.

By configuring the piston 16 like this, the area (pressure receiving area) of the portion that comes in contact with the tip portion 16c of the tubular piston 16 can be made large by the taper-shaped portion 21 when the inner ring 9 is tilted, thereby carrying the load stably while suppressing the deformation and wear of the piston 16 and the inner ring 9.

Numerals 29 and 30 denote an O-ring to keep air-tightness between wall surfaces 18a and 18b of the hollow cylinder, which O-ring can be replaced with a twister ring (X-ring). In the case where the O-ring is used in reciprocating movement, twisting may occur in a groove housing the O-ring. However, the twister ring (X-ring) has an X-shaped cross section, and therefore, twisting cannot be occurred. Further, the twister ring needs a smaller radius-directional allowance than the O-ring, hence has smaller contact pressure, and smaller friction and wear, and therefore, is excellent in endurance, thereby improving sealing performance. Moreover, it can improve reactions at a low pressure in the floating mechanism, thereby securing stable movements of the machine tool over low to high pressures.

Further, the tilt angle of the taper-shaped portion 21 formed on the tip portion 16c of the piston 16 is preferable to be substantially equal to the tilt angle of the taper-shaped portion 15 formed on the bottom surface portion 9c of the above-described inner ring 9.

As one example, if the maximum tilt angle is five degrees of the shaft of the tool with respect to a reference state where the tool shaft is perpendicular to the working surface of a workpiece, it is possible to set the tilt angle of the taper-shaped portion 15 of the portion formed on the bottom surface portion 9c of the hollow circular-plate-shaped inner ring 9 that comes in contact with the inner ring receiving portion 8b of the outer ring 8 and the tilt angle of the taper-shaped portion 21 formed on the tip portion 16c of the tubular piston 16 to the same tilt angle of five degrees. In this configuration, it is possible to improve the strength of the contact portion of each of the taper-shaped portions 15 and 21 and disperse the stresses on these contact portions. Further, it is possible to give the same stress distribution to those contact portions, thereby preventing extra deformations.

Further, a piston 17 in FIG. 3(*b*) includes a hollow portion 17a, an outer circumferential portion 17b, and a tip portion 17c. An O-ring 22 is mounted on the tip portion 17c of the tubular piston 17 that comes in contact with the top surface portion 9b of the inner ring 9.

In this configuration of the piston 17, owing to the O-ring 22, the portion that comes in contact with the tip portion 17c of the tubular piston 17 can be prevented from coming in direct contact with metal, thereby carrying the load stably while suppressing the deformation and wear of the piston 17 and the inner ring 9.

Figure 4:
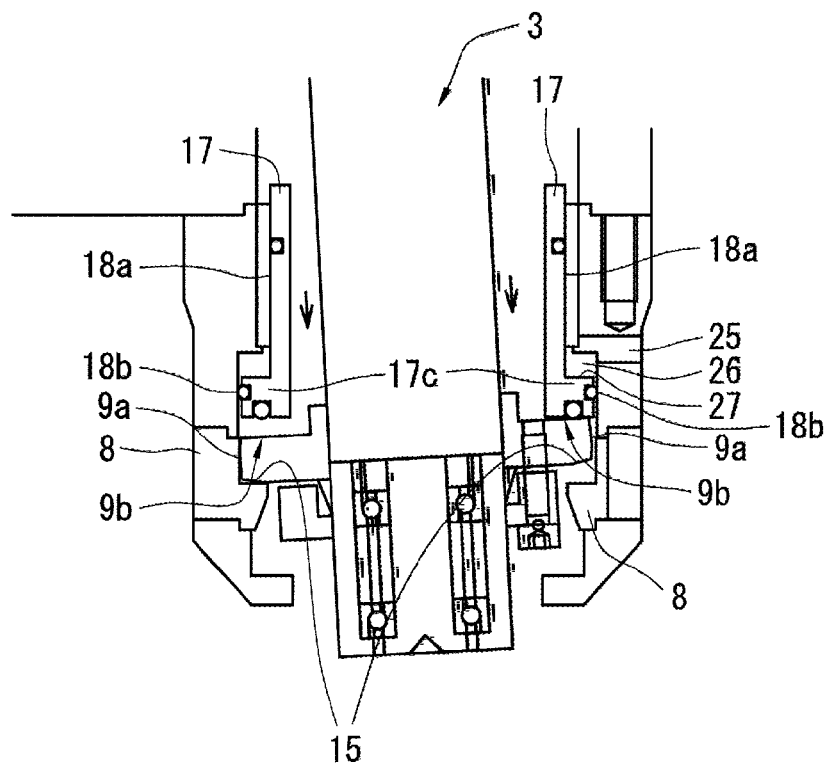
FIG. 4 is a cross-sectional view showing one portion of the machine tool according to the present invention.

FIG. 4 is a cross-sectional view showing one portion of the machine tool 20 according to the present invention. As shown in the figure, if force larger than a predetermined value is applied to each of the various tools, the tool driving section 3 is tilted and kept in this state. In this state, the tip portion 17c on the right side of the piston 17 in the drawings is in contact with the top surface portion 9b of the inner ring 9, while the tip portion 17c on the left side of the piston 17 is floating, out of contact with the top surface portion 9b of the inner ring 9. At the same time, the piston 17 is being supplied with air at a predetermined pressure at an air chamber 26 through an air inlet 25, and therefore, the predetermined pressure is applied on an air pressure receiving surface 27.

Figure 5:
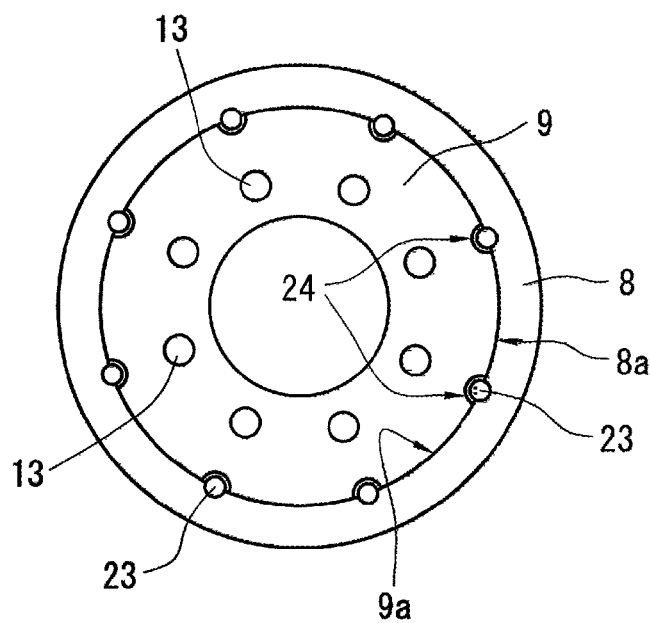
FIG. 5 is an explanatory figure showing one portion of the floating section of the machine tool according to the present invention.

FIG. 5 is an explanatory figure showing the floating section 4 of the machine tool 20 according to the present invention as viewed from the side of the top surface portion 9b of the inner ring 9. As shown in the figure, the inner circumferential surface portion 8a of the outer ring 8 has a cylinder-shaped baffle segment 23 formed on it at a position where it comes in contact with the outer circumferential surface portion 9a of the inner ring 9. The baffle segment 23 is caught in a circular-shaped concave portion 24 formed in the outer circumferential surface portion 9a of the inner ring 9.

Therefore, the cylinder-shaped baffle 23 can carry torque loads applied in the rotational direction of the inner ring 9. Further, since the concave portion 24 is circular in shape, its contact area with the cylinder-shaped baffle 23 can be made large to disperse the torque loads by using the plurality of baffles 23, 23 thereby suppressing the deformation and wear of the inner ring 9. Moreover, the above-described construction to disperse and receive a radial load and a torque load independently from each other enables carrying the loads stably while suppressing the deformation and wear of the pistons 16 and 17, the outer ring 8, and the inner ring 9.

INDUSTRIAL APPLICABILITY

The machine tool equipped with floating mechanism according to the present invention is used as a machine that machines workpieces.

DESCRIPTION OF REFERENCE NUMERALS

1 Robot arm
2 Hollow cylinder section
3 Tool driving section
4 Floating section
5 Chuck member
6 Bearing mechanism
7 Motor
7a Rotary shaft
8 Outer ring
9 Inner ring
10 Various tools
11 Wedge member
12 Tightening member
13 Bolt
14 Center point
15 Taper-shaped portion
16, 17 Piston
18a, 18b Wall surfaces of the hollow cylinder
20 Machine tool
21 Taper-shaped portion
22 O-ring
23 Baffle segment
24 Concave portion
25 Air inlet
26 Air chamber
27 Cylinder pressure receiving surface

The invention claimed is:

1. A machine tool equipped with a floating mechanism for machining a workpiece by using various tools fit to a machine having a robot arm or a numerical control (NC) device, the machine tool comprising:
a hollow cylinder section including a tubular piston;
a tool driving section at least one portion of which is fixed in an internal space of the hollow cylinder section to drive the various tools; and
a floating section which exists between the tool driving section and the hollow cylinder section, wherein one portion of the floating section comes in contact with the tubular piston and is pressed by the tubular piston at a predetermined pressure; and
said floating section includes a hollow circular-plate-shaped inner ring having an outer circumferential surface portion, a top surface portion, and a bottom surface portion, and an outer ring having an inner circumferential surface portion and an inner ring receiving portion, the outer ring being fixed to a side of the robot arm, the inner ring being fixed to a side of the tool driving section, and an outer circumferential surface of the inner ring being formed of a spherical surface equidistant from a center point of the hollow circular-plate-shaped inner ring.

2. The machine tool equipped with floating mechanism according to claim 1, wherein the bottom surface portion of the hollow circular-plate-shaped inner ring has a taper-shaped portion that comes in contact with the inner ring receiving portion of the outer ring.

3. The machine tool equipped with floating mechanism according to claim 2, wherein a tip portion of the tubular piston comes in contact with the top surface portion of the hollow circular-plate-shaped inner ring and has a taper-shaped portion.

4. The machine tool equipped with floating mechanism according to claim 3, wherein a tilt angle of the taper-shaped portion of the portion formed on the bottom surface portion of the hollow circular-plate-shaped inner ring that comes in contact with the inner ring receiving portion of the outer ring is substantially equal to a tilt angle of the taper-shaped portion formed on the tip portion of the tubular piston.

5. The machine tool equipped with floating mechanism according to claim 1, wherein a tip portion of the tubular piston comes in contact with the top surface portion of the hollow circular-plate-shaped inner ring and includes an O-ring.

6. The machine tool equipped with floating mechanism according to claim 1, wherein the inner circumferential surface portion of the outer ring has a baffle segment at a position where the inner circumferential surface comes in contact with the outer circumferential surface portion of the inner ring.

7. The machine tool equipped with floating mechanism according to claim 1, comprising a twister ring at a position where an outer circumferential surface of the tubular piston comes in contact with a surface of the hollow cylinder section.

8. A machine tool equipped with floating mechanism for machining a workpiece by using various tools fit to a machine having a robot arm or a numerical control (NC) device, the machine tool comprising:

a hollow cylinder section including a tubular piston;

a tool driving section at least one portion of which is fixed in an internal space of the hollow cylinder section to drive the various tools; and a floating section which exists between the tool driving section and the hollow cylinder section, wherein one portion of the floating section comes in contact with the tubular piston and is pressed by the tubular piston at a predetermined pressure; and said floating section includes a hollow circular-plate-shaped inner ring having an outer circumferential surface portion, a top surface portion, and a bottom surface portion, and an outer ring having an inner circumferential surface portion and an inner ring receiving portion, the outer ring being fixed to a side of the robot arm, the inner ring being fixed to a side of the tool driving section, and an outer circumferential surface of the inner ring being formed of a spherical surface equidistant from a center point of the hollow circular-plate-shaped inner ring, wherein the bottom surface portion of the hollow circular-plate-shaped inner ring has a taper-shaped portion that comes in contact with the inner ring receiving portion of the outer ring.

9. The machine tool equipped with floating mechanism according to claim 8, wherein the tip portion of the tubular piston comes in contact with the top surface portion of the hollow circular-plate-shaped inner ring and includes an O-ring.

10. The machine tool equipped with floating mechanism according to claim 8, wherein the inner circumferential surface portion of the outer ring has a baffle segment at a position where the inner circumferential surface comes in contact with the outer circumferential surface portion of the inner ring.

11. The machine tool equipped with floating mechanism according to claim 8, comprising a twister ring at a position where the outer circumferential surface of the tubular piston comes in contact, with a wall surface of the hollow cylinder section.

12. A machine tool equipped with floating mechanism for machining a workpiece by using various tools fit to a machine having a robot arm or an NC device, the machine tool comprising:

a hollow cylinder section including a tubular piston;

a tool driving section at least one portion of which is fixed in an internal space of the hollow cylinder section to drive the various tools; and a floating section which exists between the tool driving section and the hollow cylinder section, wherein one portion of the floating section comes in contact with the tubular piston and is pressed by the tubular piston at a predetermined pressure; and said floating section includes a hollow circular-plate-shaped inner ring having an outer circumferential surface portion, a top surface portion, and a bottom surface portion, and an outer ring having an inner circumferential surface portion and an inner ring receiving portion, the outer ring being fixed to a side of the robot arm, the inner ring being fixed to a side of the tool driving section, and an outer circumferential surface of the inner ring being formed of a spherical surface equidistant from a center point of the hollow circular-plate-shaped inner ring, wherein the bottom surface portion of the hollow circular-plate-shaped inner ring has a taper-shaped portion that comes in contact with the inner ring receiving portion of the outer ring, wherein a tip portion of the tubular piston comes in contact with the top surface portion of the hollow circular-plate-shaped inner ring and has a taper-shaped portion.

13. The machine tool equipped with floating mechanism according to claim 12, wherein a tilt angle of the taper-shaped portion of the portion formed on the bottom surface portion of the hollow circular-plate-shaped inner ring that comes in contact with the inner ring receiving portion of the outer ring is substantially equal to a tilt angle of the taper-shaped portion formed on the tip portion of the tubular piston.

\* \* \* \* \*